US012678843B2

(12) United States Patent
Sarathy et al.

(10) Patent No.: US 12,678,843 B2
(45) Date of Patent: Jul. 14, 2026

(54) WASTE TREATMENT SYSTEM AND METHOD BASED ON INTEGRATED NATURAL AND CHEMICAL PROCESSES

(71) Applicant: KING ABDULLAH UNIVERSITY OF SCIENCE AND TECHNOLOGY, Thuwal (SA)

(72) Inventors: Subram Maniam Sarathy, Thuwal (SA); Ribhu Gautam, Thuwal (SA); Tsu-Fang Hong, Thuwal (SA); Bruce Russell Cowley, Riyadh (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 692 days.

(21) Appl. No.: 18/037,902

(22) PCT Filed: Nov. 30, 2021

(86) PCT No.: PCT/IB2021/061146
§ 371 (c)(1),
(2) Date: May 19, 2023

(87) PCT Pub. No.: WO2022/118198
PCT Pub. Date: Jun. 9, 2022

(65) Prior Publication Data
US 2024/0001417 A1     Jan. 4, 2024

Related U.S. Application Data

(60) Provisional application No. 63/121,397, filed on Dec. 4, 2020.

(51) Int. Cl.
*B09B 3/60* (2022.01)
*B01J 6/00* (2006.01)
(Continued)

(52) U.S. Cl.
CPC ................. *B09B 3/60* (2022.01); *B01J 6/008* (2013.01); *B09B 3/40* (2022.01); *B09B 3/70* (2022.01);
(Continued)

(58) Field of Classification Search
CPC ..... B09B 3/60; B09B 3/40; B09B 3/70; B01J 6/008; C05F 3/06; C05F 17/05; C05F 17/10; C10L 5/42; C01B 3/22
See application file for complete search history.

(56) References Cited

U.S. PATENT DOCUMENTS

| | | | |
|---|---|---|---|
| 7,794,601 B1 * | 9/2010 | Lima ...................... | B01D 15/00 |
| | | | 502/437 |
| 10,227,626 B2 | 3/2019 | Popa et al. | |
| 2014/0020630 A1 | 1/2014 | Courtright | |

FOREIGN PATENT DOCUMENTS

WO     WO-2019086975 A1 *     5/2019     ............. C11C 3/126

OTHER PUBLICATIONS

Alvarez, L., "The Role of Black Soldier Fly, *Hermetia illucens* (L.) (Diptera: Stratiomyidae) in Sustainable Waste Management in Northern Climates," Thesis and Dissertation, University of Windsor, 2022, pp. 1-158.

(Continued)

*Primary Examiner* — Lessanework Seifu
(74) *Attorney, Agent, or Firm* — PATENT PORTFOLIO BUILDERS PLLC

(57) ABSTRACT

A waste treatment plant integrates larvae-based natural processing with chemical processing for transforming animal waste into chemical products. The plant includes a pretreatment unit configured to receive animal waste, moisturize the animal waste with water, provide black soldier fly, BSF, larvae, and load a tray with a mixture of the animal waste, water, and the BSF larvae; a storage room configured to receive the tray and hold the tray between 10 and 14 days;

(Continued)

a separation mechanism configured to receive a content of the tray after the 10 to 14 days, and separate the BSF larvae from undigested animal waste; a chitin and protein extraction unit configured to receive the BSF larvae and extract chitin and proteins; and a thermo-processing unit configured to receive the undigested animal waste and extract bio-oil and bio-char.

20 Claims, 12 Drawing Sheets

(51) Int. Cl.

| | |
|---|---|
| *B09B 3/40* | (2022.01) |
| *B09B 3/70* | (2022.01) |
| *C01B 3/22* | (2006.01) |
| *C05F 17/05* | (2020.01) |
| *C10L 5/42* | (2006.01) |
| *B09B 101/70* | (2022.01) |

(52) U.S. Cl.
CPC .............. *C01B 3/22* (2013.01); *C05F 17/05* (2020.01); *C10L 5/42* (2013.01); *B09B 2101/70* (2022.01)

(56) References Cited

OTHER PUBLICATIONS

Baniasadi, M., et al., "Waste to Energy Valorization of Poultry Litter by Slow Pyrolysis," Renewable Energy, Jan. 17, 2016, vol. 90, pp. 458-468, Elsevier Ltd.

Cammack, J.A., et al., "The Impact of Diet Protein and Carbohydrate on Select Life-History Traits of The Black Soldier Fly *Hermetia illucens* (L.) (Diptera: Stratiomyidae)," Insects, May 31, 2017, vol. 8, No. 56, pp. 1-14.

Gabler, F., "Using Black Soldier Fly for Waste Recycling and Effective *Salmonella* spp. Reduction," Thesis, Swedish University of Agricultural Sciences, Sweden, Oct. 29, 2014, pp. 1-26.

Hadroug, S., et al., "Pyrolysis Process as a Sustainable Management Option of Poultry Manure: Characterization of the Derived Biochars and Assessment of their Nutrient Release Capacities," Water, 2019, vol. 11, No. 227, pp. 1-18.

Hu, X., et al., "Biomass Pyrolysis: A Review of the Process Development and Challenges from Initial Researches up to the Commercialisation Stage," Journal of Energy Chemistry, Feb. 5, 2019, vol. 39, pp. 109-143, Elsevier B.V. and Science Press.

International Search Report in corresponding/related International Application No. PCT/IB2021/061146, date of mailing Jul. 29, 2022.

Matthäus, B., et al., "Renewable Resources from Insects: Exploitation, Properties, and Refining of Fat Obtained by Cold-Pressing from *Hermetia illucens* (Black Soldier Fly) Larvae," European Journal of Lipid Science and Technology, May 29, 2018, vol. 121, pp. 1800376 (1-11), WILEY-VCH Verlag Gmbh & Co., KGaA, Weinheim.

Pandey, D.S., et al., "Fast Pyrolysis of Poultry Litter in a Bubbling Fluidised Bed Reactor: Energy and Nutrient Recovery," Sustainability, 2019, vol. 11, No. 2533, pp. 1-17.

Sarpong, D., et al., "Biodegradation by Composting of Municipal Organic Solid Waste into Organic Fertilizer using the Black Soldier Fly (*Hermetia illucens*) (Diptera: Stratiomyidae) Larvae, " International Journal of Recycling of Organic Waste in Agriculture, May 3, 2019, vol. 8, pp. 45-54, Springer.

Smets, R., et al., "Sequential 1 Extraction and Characterisation of Lipids, Proteins, 2 and Chitin from Black Soldier Fly (*Hermetia illucens*) Larvae, 3 Prepupae, and Pupae," Waste Biomass Valorization, Dec. 2020, pp. 1-28.

Wang, Y.-S., et al., "Review of Black Soldier Fly (*Hermetia illucens*) as Animal Feed and Human Food," Foods, 2017, vol. 6, No. 91, pp. 1-23.

Written Opinion of the International Searching Authority in corresponding/related International Application No. PCT/IB2021/061146, date of mailing Jul. 29, 2022.

Zurbrügg, C., et al., "From Pilot to Full Scale Operation of a Waste-to-Protein Treatment Facility," www.unescap.org/sites/default/files/Session4%20-%20imanol1.pdf, Nov. 28-Dec. 1, 2016, pp. 1-15.

First Substantive Examination Report in corresponding/related Saudi Arabian Application No. 523440999, dated Mar. 14, 2024.

\* cited by examiner

| Test | Value |
|---|---|
| Moisture | 8.90 % |
| Organic Matter | 70.80 % |
| pH 6% | 8.32 |
| Total Nitrogen | 2.40 % |
| Total organic carbon | 1.096 % |
| Zinc | 736.39 ppm |
| Calcium | 34298.20 ppm |
| Phosphorus | 1.63 % |
| Potassium | 2.18 % |
| Sodium chloride | 2.57 % |
| Sodium | 9061.45 ppm |
| Sulfur | 6013.14 ppm |
| Chloride | 15551.36 ppm |
| Electrical Conductivity (1:5) | 21.07 mS cm$^{-1}$ |
| Iron | 247.07 ppm |
| Magnesium | 7545.71 ppm |
| Manganese | 584.25 ppm |
| Copper | 70.47 ppm |

FIG. 3

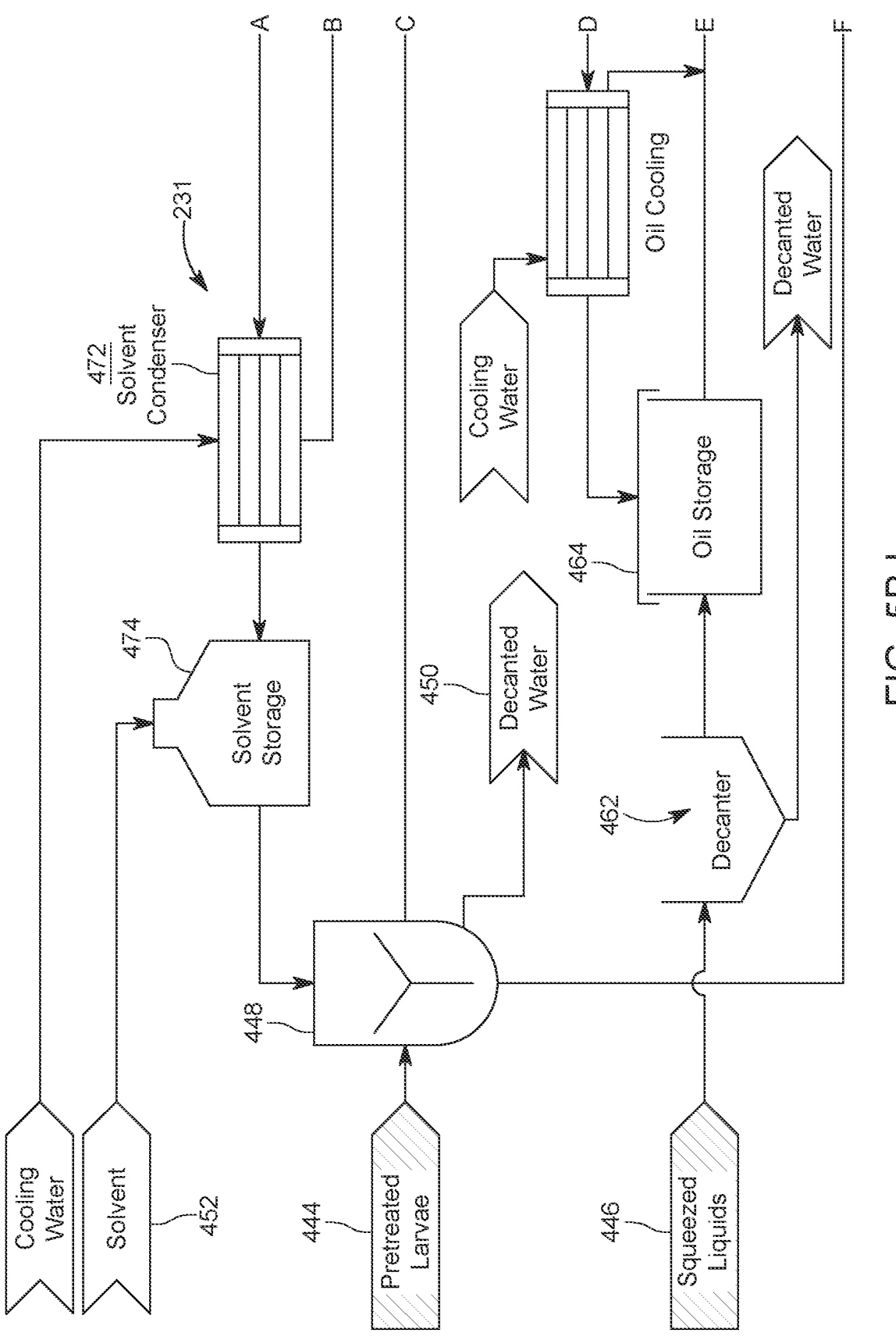
FIG. 5B.I

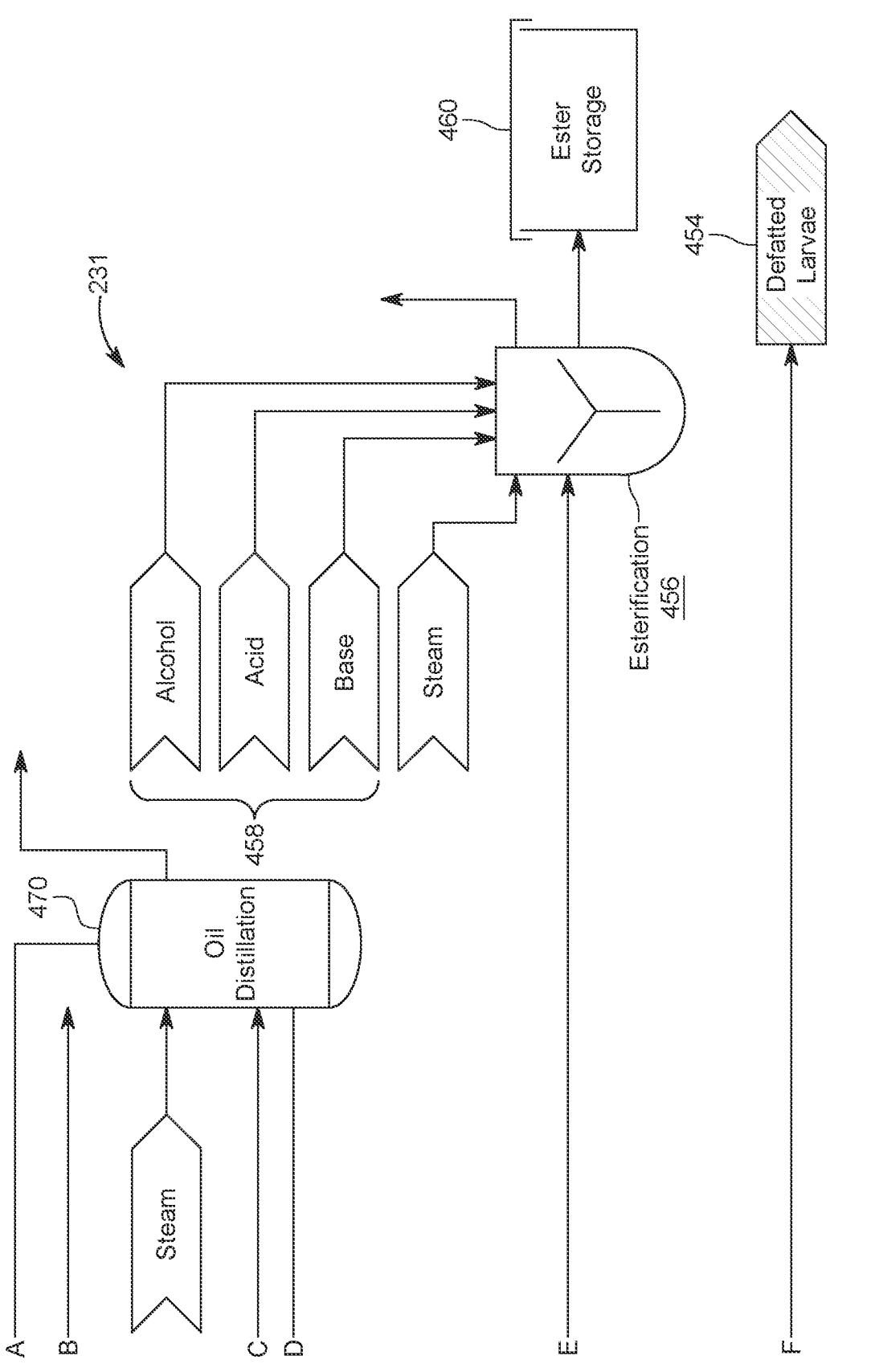
FIG. 5B.II

| Histidine | Threonine | Methionine |
| Serine | Alanine | Valine |
| Arginine | Proline | Isoleucine |
| Glycine | Cystine | Leucine |
| Aspartic acid | Lysine | Phenylalanine |
| Glutamic acid | Tyrosine | Tryptophan |

FIG. 6

| Saturated fatty acids | Unsaturated fatty acids |
|---|---|
| Lauric acid (12:0) | Hypogeic acid (16:1Δ7), cis |
| Myristic acid (14:0) | Palmitoleic acid (16:1Δ7), trans |
| Palmitic acid (16:0) | Oleic acid (18:1Δ2) |
| Stearic acid (18:0) | Linoleic acid (18:2Δ9,12) |
| Arachidic acid (20:0) | Linolenic acid (18:3Δ9,12,15) |

FIG. 7

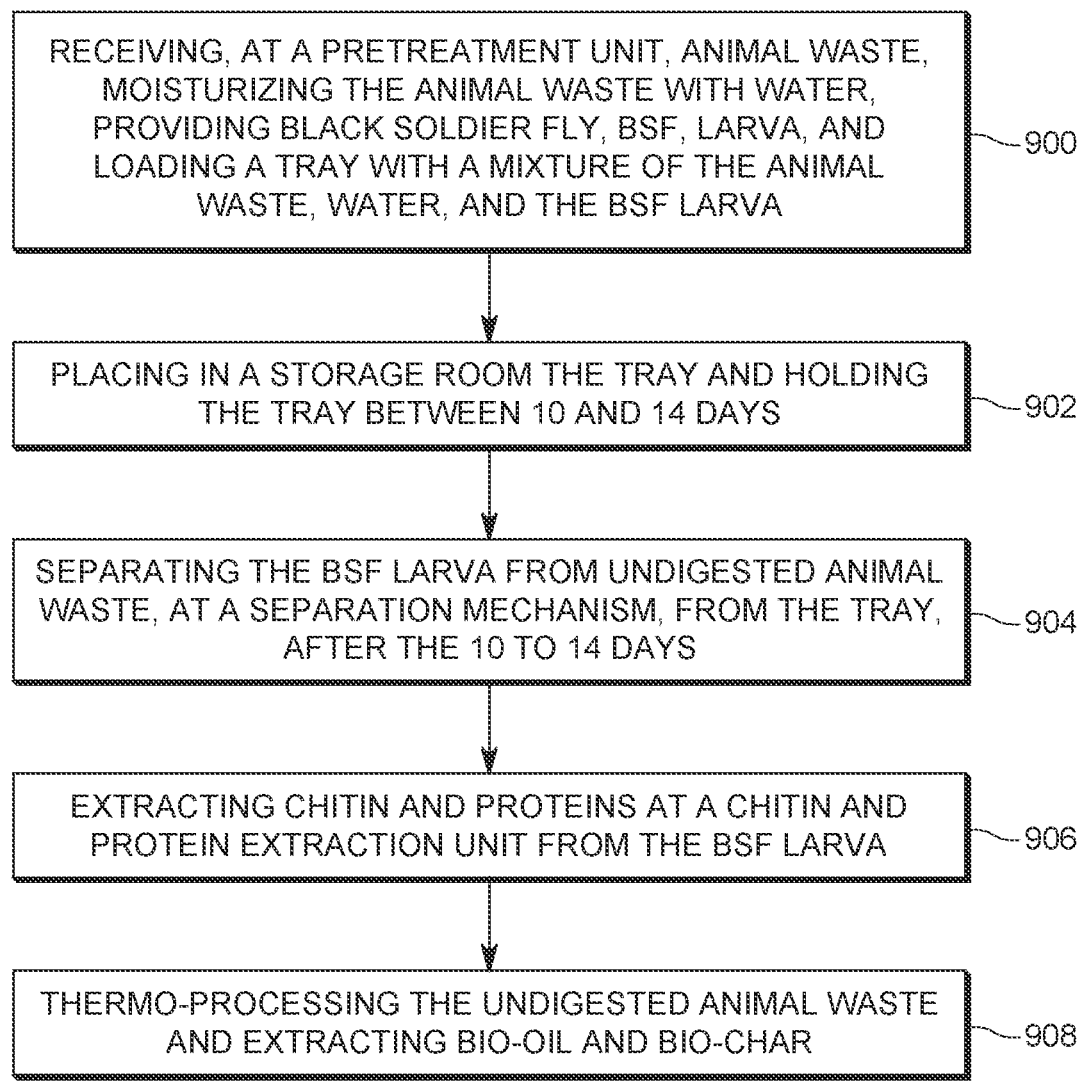

RECEIVING, AT A PRETREATMENT UNIT, ANIMAL WASTE, MOISTURIZING THE ANIMAL WASTE WITH WATER, PROVIDING BLACK SOLDIER FLY, BSF, LARVA, AND LOADING A TRAY WITH A MIXTURE OF THE ANIMAL WASTE, WATER, AND THE BSF LARVA —900

PLACING IN A STORAGE ROOM THE TRAY AND HOLDING THE TRAY BETWEEN 10 AND 14 DAYS —902

SEPARATING THE BSF LARVA FROM UNDIGESTED ANIMAL WASTE, AT A SEPARATION MECHANISM, FROM THE TRAY, AFTER THE 10 TO 14 DAYS —904

EXTRACTING CHITIN AND PROTEINS AT A CHITIN AND PROTEIN EXTRACTION UNIT FROM THE BSF LARVA —906

THERMO-PROCESSING THE UNDIGESTED ANIMAL WASTE AND EXTRACTING BIO-OIL AND BIO-CHAR —908

FIG. 9

WASTE TREATMENT SYSTEM AND METHOD BASED ON INTEGRATED NATURAL AND CHEMICAL PROCESSES

CROSS-REFERENCE TO RELATED APPLICATIONS

This application is a U.S. National Stage Application of International Application No. PCT/IB2021/061146, filed on Nov. 30, 2021, which claims priority to U.S. Provisional Patent Application No. 63/121,397, filed on Dec. 4, 2020, entitled "INNOVATIVE METHOD USING BLACK SOLDIER FLY LARVA FOR TREATING AGRICULTURE AND MUNICIPAL WASTE WITH AN OVERALL CARBON NEGATIVE IMPACT," the disclosures of which are incorporated herein by reference in their entirety.

BACKGROUND

Technical Field

Embodiments of the subject matter disclosed herein generally relate to an integrated system and method for treating waste, and more particularly, to an integrated process/plant where the waste is first naturally treated with larvae to reduce the amount of nitrogen, after which the undigested waste is thermo-chemically processed while the larvae are separately processed for generating one or more of biolubricant additives, proteins, and chitin.

Discussion of the Background

Saudi Arabia's growing population, including expatriates and a significant rise in Umrah visitors, have resulted in the increasing chicken consumption. According to a report, the domestic chicken consumption is expected to increase by 4% from 1.33 million MT (in 2019) to 1.38 million MT (in 2020). This trend is observed not only in Saudi Arabia but worldwide and also for other consumed animals. This chicken waste is expected to rise by 300% to 204,000 MT. The disposal of chicken waste in particular and animal waste in general is cost intensive.

Broadly, the composition of the waste collected at the end of the flock after depletion of farms includes about 25-30% wood shavings and the rest is chicken manure. Also, the overall moisture content in the waste is 15-25%. The disposal of this waste with the existing technologies is becoming more challenging owing to required land, water, and air pollution. The traditional landfilling technique may result in several negative consequences such as spread of pathogens, emission of toxic substances, greenhouse gas emissions, surface water eutrophication, and polluting of groundwater.

The increasing amount of waste and challenges associated with its disposal are driving the chicken industry (and, in general, the entire meat industry) towards the sustainable management of this waste to mitigate the health and environmental hazards. Owing to the composition (high minerals and nitrogen content) of the waste, gasification and incineration are not attractive options. This waste generally contains high amounts of organic carbon and nitrogen along with potassium and phosphorus, which can significantly enhance the soil fertility and make soil nutrient-rich for agricultural purposes. Thus, while currently disposing this waste, considerable amounts of valuable resources are lost. There is an urgent need to develop technologies minimizing the loss of valuable resources.

BRIEF SUMMARY OF THE INVENTION

According to an embodiment, there is a waste treatment plant that integrates larvae-based natural processing with chemical processing for transforming animal waste into chemical products. The plant includes a pretreatment unit configured to receive animal waste, moisturize the animal waste with water, provide black soldier fly, BSF, larvae, and load a tray with a mixture of the animal waste, water, and the BSF larvae, a storage room configured to receive the tray and hold the tray between 10 and 14 days, a separation mechanism configured to receive a content of the tray after the 10 to 14 days, and separate the BSF larvae from undigested animal waste, a chitin and protein extraction unit configured to receive the BSF larvae and extract chitin and proteins, and a thermo-processing unit configured to receive the undigested animal waste and extract bio-oil and bio-char. An amount of nitrogen in the animal waste is larger than 2.0% and an amount of nitrogen in the undigested animal waste is smaller than 1.5%.

According to another embodiment, there is a method that integrates larvae-based natural processing with chemical processing for transforming animal waste into chemical products in a waste treatment plant. The method includes receiving, at a pretreatment unit, animal waste, moisturizing the animal waste with water, providing black soldier fly, BSF, larvae, and loading a tray with a mixture of the animal waste, water, and the BSF larvae, placing in a storage room the tray and holding the tray between 10 and 14 days, separating the BSF larvae from undigested animal waste, at a separation mechanism, from the tray, after the 10 to 14 days, extracting chitin and proteins at a chitin and protein extraction unit from the BSF larvae, and thermo-processing the undigested animal waste and extracting bio-oil and bio-char. An amount of nitrogen in the animal waste is larger than 2.0% and an amount of nitrogen in the undigested animal waste is smaller than 1.5%.

BRIEF DESCRIPTION OF THE DRAWINGS

For a more complete understanding of the present invention, reference is now made to the following descriptions taken in conjunction with the accompanying drawings, in which:

FIG. 3 illustrates a composition of the chicken waste that is processed by the integrated waste treatment plant of FIG. 2;

FIGS. 5B.I and 5B.II illustrate a process flow for lipid extraction from the larva;

FIG. 6 illustrates the amino acid profile obtained from the grown larva;

FIG. 7 illustrates the fatty acid profile of the oil obtained from larvae;

FIG. 9 is a flow chart of a method for larvae-based natural processing integrated with thermochemical processing for transforming animal waste into chemical products in a waste treatment plant.

DETAILED DESCRIPTION OF THE INVENTION

Figure 1:
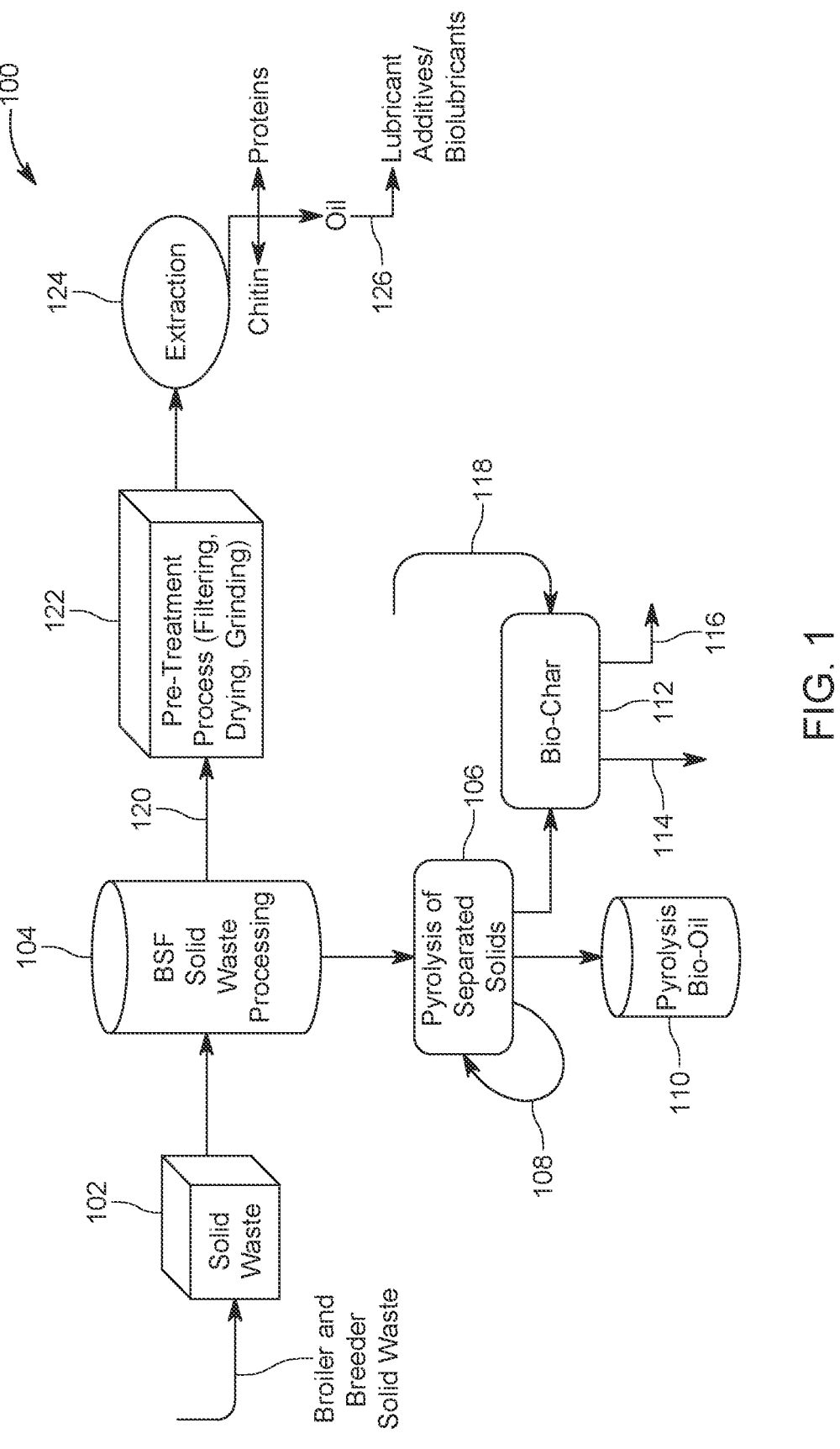
FIG. 1 is a schematic diagram of an integrated larvae-based natural processing with thermochemical processing for transforming animal waste into chemical products in a waste treatment plant.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to chicken waste. However, the embodiments to be discussed next are not limited to chicken waste, but may be applied to other type of waste that has a high content of nitrogen.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an integrated plant is configured to extract useful resources from the waste using a two-step process in which the waste nitrogen content is reduced using black soldier fly larva (BSF) after which the undigested waste is treated with a pyrolysis process. The larva is separately processed to extract various useful materials, as discussed next.

Pyrolysis is one thermochemical pathway to convert waste without losing valuable resources. In the process, deconstruction of organics in a moderate temperature range (350-700° C.) in the absence of air (or oxygen) takes place. The products obtained from pyrolysis are high-energy value bio-oil and a carbon-rich porous biochar [1]. The bio-oil from the pyrolysis of the waste is rich in valuable compounds such as phenol, aldehyde, furan and sugars and can serve as a source of platform chemicals. The biochar also obtained from the pyrolysis process has high capability for carbon sequestration and reducing greenhouse emissions. Also, biochars find application in soil amendment and removal of pollutants from wastewater streams. However, the nitrogen content of the untreated waste is expected to be high (about 1.5% or larger) and the formation of NOx cannot be ignored during the pyrolysis of the waste. So, removal of the nitrogen from the untreated waste is desired to be achieved prior to the pyrolysis process, in order to implement pyrolysis-based technologies for treating the chicken waste. Although, there have been recently lab-scale studies on the pyrolysis of chicken waste with promising results, for large scale operations, there are no known processes that mitigate the amount of nitrogen [2-4].

The use of black soldier fly (BSF) larva for the degradation of organic matter such as food waste and municipal organic solid waste for producing organic fertilizer and successfully diverting the waste away from landfilling has been tried before [5, 6]. BSF treatment has been successful for a wide variety of waste, ranging from swine manure [7], remains of dead animals [8], and human and animal faeces. The composition of the diet impacts the development, survival, longevity and egg production of BSF and are selective to the amount of the waste to be degraded [9]. The BSF larvae feed on the organic materials such as fruits and vegetables, food waste, slaughterhouse waste and chicken manure to grow.

According to an embodiment, the two processes discussed above are integrated into a single plant to process the chicken waste to produce valuable chemicals. The BSF process is expected to reduce the amount of nitrogen in the undigested waste below 1.5% and thus, the thermochemical process is expected to be more efficient in transforming the waste into bio-oil and bio-char. The plant is configured for the integration of the pyrolysis process with the BSF processing and maximizing the resource recovery to reduce the net overall impact on the environment. In addition, the plant and associated integrated processes generate multiple opportunities for waste valorization as well as the ability to generate green hydrogen and net carbon negative emissions.

One feature of the novel plant is to treat the chicken waste to reduce the overall carbon footprint of the chicken processing unit. In this regard, FIG. 1 schematically illustrates the steps depicting the integration of the BSF processing with pyrolysis to produce a wide variety of valuable compounds. More specifically, in step 102, the solid waste is provided, and the solid waste may include broiler and breeder solid waste. The solid waste is then provided to the BSF processing unit 104 where, as discussed later in more detail, the larvae are supplied to the solid waste for waste transformation. The result of this process is the grown larvae and the waste not consumed by the larvae, i.e., the undigested waste. The solid (including insect frass) that is consumed by the larvae has now a reduced amount of nitrogen (below 1.5%), and this undigested solid is most appropriate for the pyrolysis process, which takes place in step 106. Pyrolysis gases may be used in step 108 to provide heat for reducing the energy requirement during the step 106. The results of the pyrolysis process in step 106 are the bio-oil and the bio-char. The bio-oil is used in step 110 to generate drop-in fuel, additive, bio-insecticide, etc. The bio-char is used in step 112 to generate solid fuel 114 for heating furnaces (e.g., brick kilns) and to treat the wastewater 118, in step 116, from the broiler processing unit. The grown BSF larvae 120 from step 104 are separated from the rest of the solid products and pre-treated in step 122, for example, by filtering, drying, grinding, etc. The result of this step is then processed in step 124 to extract chitin (a polysaccharide with N-acetylglucosamine as monomer), proteins (can be used as broiler feed), and oil rich in fatty acids. The oils may be further used in step 126 to generate lubricant additives and/or bio-lubricants. All these steps are integrated in a single plant as now discussed in more detail.

It is noted that the BSF larvae are not able to digest the entire solid waste, so the undigested residual waste consists of wood shavings, feathers and insect frass. Integration of the pyrolysis process with the BSF processing is advantageous as hard-to-degrade waste (residue from BSF processing) can be converted to porous and carbon-rich biochar, and bio-oil rich in platform chemicals. The plant has the capability to be net negative in term of carbon emissions.

In one embodiment, to reduce the environmental impact from the pyrolysis unit, the biochar may be used to clean in step 116 the wastewater stream 118 before being discharged. The BSF processing of waste results in the transformation of nitrogen present in the waste to chitin, a nitrogen containing polysaccharide and proteins. Thus, the low nitrogen content of the pyrolysis feed will result in low NOx emissions in the gas fraction. The use of these gases to provide heat to the pyrolysis unit for reducing the energy requirement is also possible.

In these processes, the chicken waste is not needed to be separated (or sorted) before treatment. The waste collected from the chicken processing unit is transferred to the BSF solid waste processing unit. The BSF larvae are fed in appropriate mass ratios. The life cycle of the BSF larva is considered for feeding fresh larva to effectively treat the waste. The BSF larvae may be hatched and grown in a vertical tray system that optimizes diet and stages of growth to maximize bio-conversion of feed substrate into valuable end-products. The waste generated by the BSF larvae in the BSF processing unit along with the undigested waste is filtered for separating solids. The nutrient-rich filtrate (including insect frass) is then transformed into liquid fertilizer. The separated solids which will include wood shavings and chicken feathers are sun-dried to remove the physical moisture before undergoing the pyrolysis process in step 106.

A plant 200 that can achieve the steps discussed above is schematically illustrates in FIG. 2. The plant 200 includes an enclosure or housing 202 that houses most of the components of the plant. In one embodiment, all the components of the plant are housed inside the housing 202. The solid waste 204 is brought, for example, by truck, into the housing 202 and provided to a pre-treatment unit 203, which includes a separator unit 206. The separator unit 206 may include a receiving unit 208, in which the solid waste 204 is provided, and a conveyor belt 210 that takes the solid waste 204 to be moisturized by water 212, which is supplied by a water dispenser (e.g., a pipe 214). A controller 230, which is configured to send commands, in a wireless or wired manner, to each component of the plant, controls the amount of water 212 that is supplied by the water supply pipe 214. The amount of water may be influenced by a chemical analysis of the solid waste, which may be performed just prior to suppling the solid waste 204. For example, the chemical composition of the poultry manure collected from an actual chicken farm is shown in the table in FIG. 3. The table presents an extensive analysis of the chicken manure including electrical conductivity, copper, chloride, salt and zinc content. It is noted that the organic matter is about 70%, with the total nitrogen being about 2.4%, which is considered too high for direct pyrolysis treatment. The larva processing step reduces this amount to less than 1.5%, so that the pyrolysis process becomes feasible.

Next, the solid waste 204 mixed with water 212 is provided in plural trays 220, and each tray is supplied with the BST larva 216 by a larva suppling mechanism 218, together with an appropriate quantity of starter feed. The controller 230 may again control the amount of larva to be supplied to each gray 220, based on the chemical composition of the manure, see the table in FIG. 3. This means that for each batch of manure, the analysis performed on the manure influences the decision of the controller 230 in terms of the amount of water 212 and larva 216 to be added for each tray. The trays are then stored in a storage room 222, where the temperature, pressure and amount of light are controlled by the controller 230 so that optimal growing conditions are provided for the larvae. The larva growing process is lasting for about 8 to 12 (or 10 to 14) days, during which time some of the above noted conditions inside the storage room 222 are maintain constant (for example, the amount of light). Note that the trays 220 may be stacked on top of each other, on dedicated carts 224, which can also be moved automatically between the various parts of the plant 200.

Figure 2:
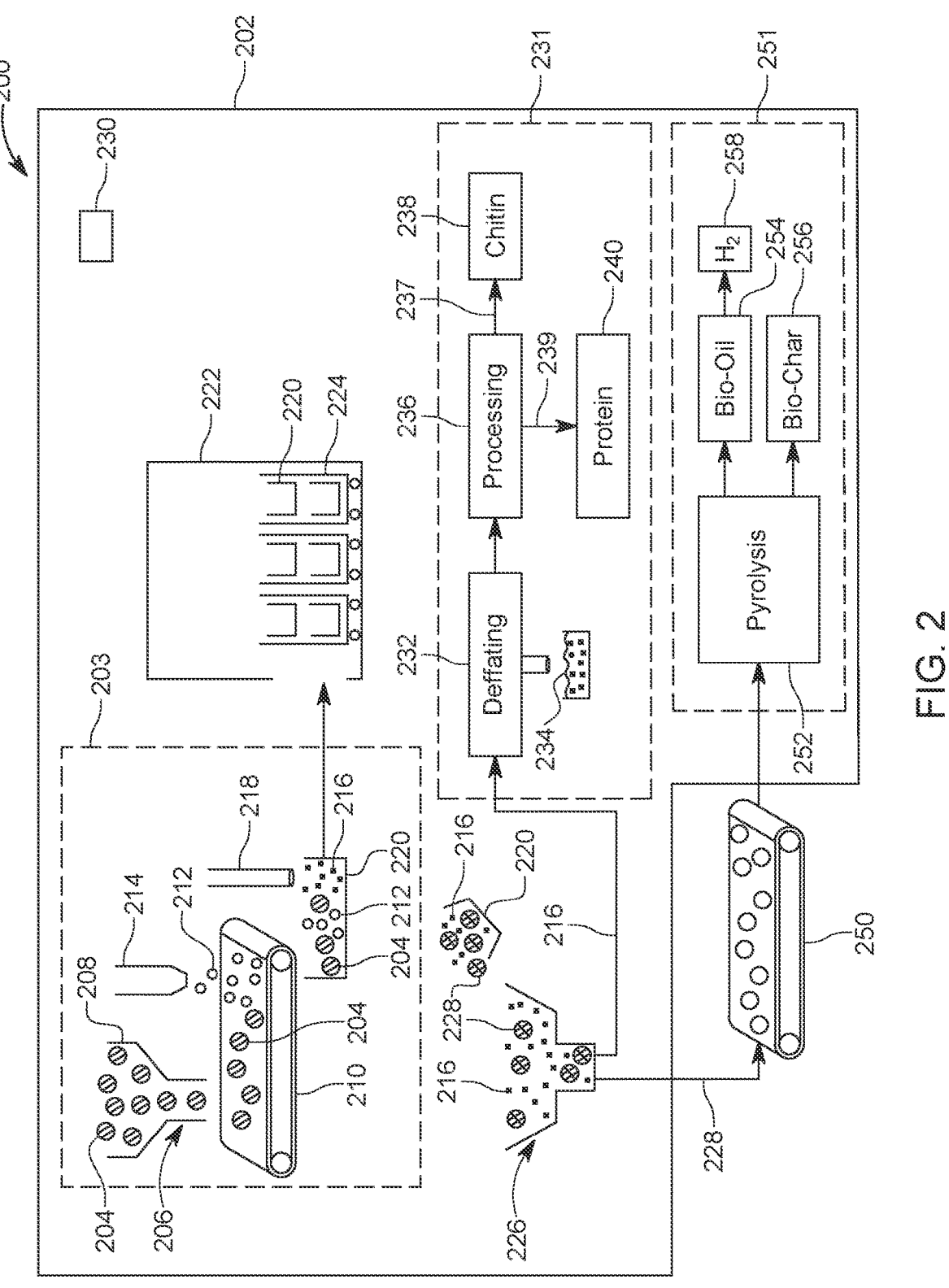
FIG. 2 schematically illustrates the structure of the integrated waste treatment plant.

After the growing period has elapsed, each tray 220 is taken to a separation mechanism 226 for separating the larvae from the undigested solid waste 228. The separation mechanism 226 may include one or more sieving devices for separating the larvae from the undigested solid waste 228. After the separation process, the grown larvae 216 follow a separate path from the undigested solid waste 228, as schematically illustrated in FIG. 2. The larvae 216 is supplied to a defatting device 232, before being fed to a chitin and protein extraction unit 231, where the larvae is mechanically processed (as discussed later in more detail) to remove the fat from the larvae. In one embodiment, the defatting device 232 may be part of the chitin and protein extraction unit 231. The fat is then collected and turned into oil 234. The nitrogen utilized during the biological metabolism in the larval stage gets stored in the form of protein and non-protein nitrogen. The protein nitrogen is present in the various amino acids and the non-protein nitrogen is present as chitin. These valuable resources may be extracted in the processing device 236. Employing fine grinding and treating with hot water, the processing device 236 outputs two fractions, the pulp fraction 237, which is rich in chitin 238, and the liquid fraction 239, which is rich in fats and proteins 240. Separation of the lipids and proteins is then performed with the help of a phase separation, for example, enzymatic hydrolysis, which separates fats and proteins in a 3-phase decanter, as discussed later in more detail. The pulp fraction 238 is chemically purified to recover the chitin. The chitin composition in the dried larva is generally between 3-6%.

Figure 4:
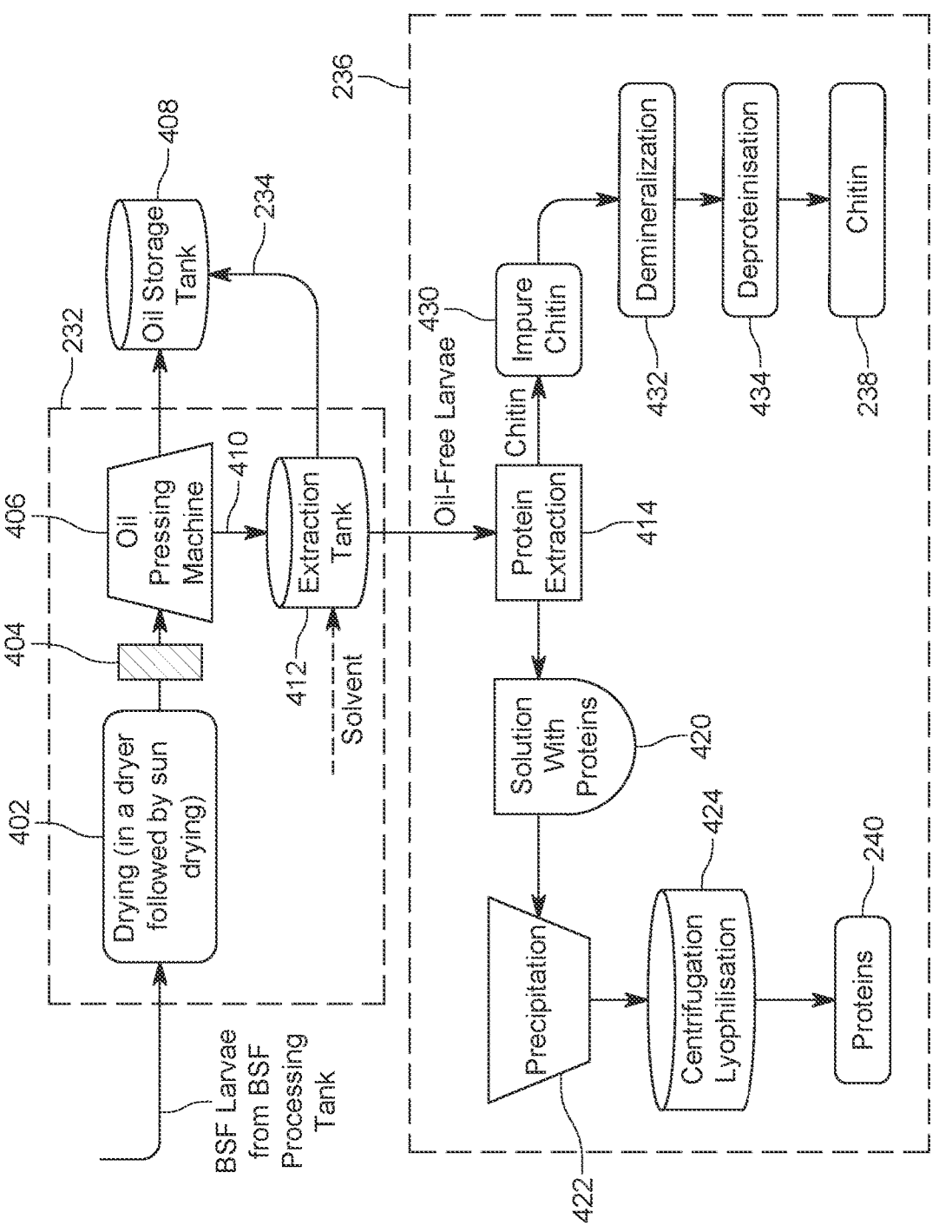
FIG. 4 schematically illustrates various processes used to extract proteins and chitin from larvae.

The schematic of the processes used to extract the oil, chitin and proteins is illustrated in FIG. 4. The collected larvae from the separation mechanism 226 may be dried in a dryer 402, which may be followed by sun drying for further dehydration. Adopting this technique to remove the moisture is favorable as the climate in Saudi Arabia is dry and sunny. As a result, this process reduces the operating cost for drying. The dried larvae are then grinded into a grinder 404, to obtain powder, which is subjected to an oil pressing machine 406 for extracting the bio-oil (lipids/fats) from the larvae. The powdered larvae may be pressed in the oil pressing machine and the extracted oil is stored in a tank 408. The remaining oil-containing larvae residue 410 then undergo solvent extraction in an extraction tank for further recovering the oil from the larvae residue. The two-step extraction process in the deffating device 232 makes the process greener as the amount of solvent to be used in extraction is considerably reduced. The extracted oil 234 is transferred to the storage tank 408.

The de-oiled (or oil-free) larvae 410 is still rich in proteins and chitin, which is extracted in the processing unit 236. The oil-free larvae fraction is dispersed in moderately hot demineralized water and kept for 2-3 hours in step 414. This solution is then filtered and the supernatant includes the extracted proteins 420, and the solid fraction contains unpurified chitin 430. The protein recovery from the solution with protein is performed based on procedures known in the art, e.g., see [11, 12]. For example, the solution with proteins 420, while in the processing device 236, is first allowed to precipitate in a precipitation tank 422, after which the solution is centrifuged in a centrifuge apparatus 424, followed by lyophilization, to extract the proteins 240. The lyophilization or freeze drying is a process in which water is removed from the solution with proteins after it is frozen and placed under a vacuum, allowing the ice to change directly from solid to vapor without passing through a liquid phase. The process consists of three separate, unique, and interdependent processes: freezing, primary drying (sublimation), and secondary drying (desorption). A variety of amino acids are present in the protein fraction 240. The amino acid profile obtained from the BSF larvae is presented in the table shown in FIG. 6. The proteins comprising these amino acids are of significant importance for animal diet. Thus, these extracted proteins may be used as chicken feed.

The solid fraction containing chitin has notable amounts of minerals and catechol. The procedure of purifying chitin is known in the art [7, 8]. The impure chitin 430 enters a demineralization unit 432 followed by a deproteinization unit 434 for obtaining the chitin 238. Chitin is a ready to sell 'high-value, low-volume' chemical. To put it into perspective, 1 ton of waste can generate 250 kg of fresh larvae and assuming a 5% chitin yield, 12.5 kg of chitin can be produced. As the BSF larvae are fed on a single substrate, the potential for conversion of chitin to high-grade chitosan is particularly attractive, as the plant could produce consistent chitin.

The oil collected in the storage tank 408 comprises long-chain saturated and unsaturated fatty acids ($>C_{12}$). The fatty acid profile of the oil obtained from BSF larvae is shown in the table of FIG. 7. Based on this composition, the extracted oil 234 is a promising candidate for biodiesel production. In order to enhance the value of the oil fraction, the oil is converted to branched biolubricants. The conversion of oil (or lipid) fraction from various sources into biolubricants has gained importance recently as substantial focus is laid on lubricant production from renewable sources. For example, recent studies utilized transesterification routes to convert oils obtained from different renewable sources, e.g., rapeseed, castor, a mixture of corn and sunflower and frying oils into biolubricants. A very effective high viscosity and branched $C_{32}$-$C_{36}$ biolubricant base oil is produced from lipids using $Ru_3Sn_7$ nanoclusters.

Figure 5A:
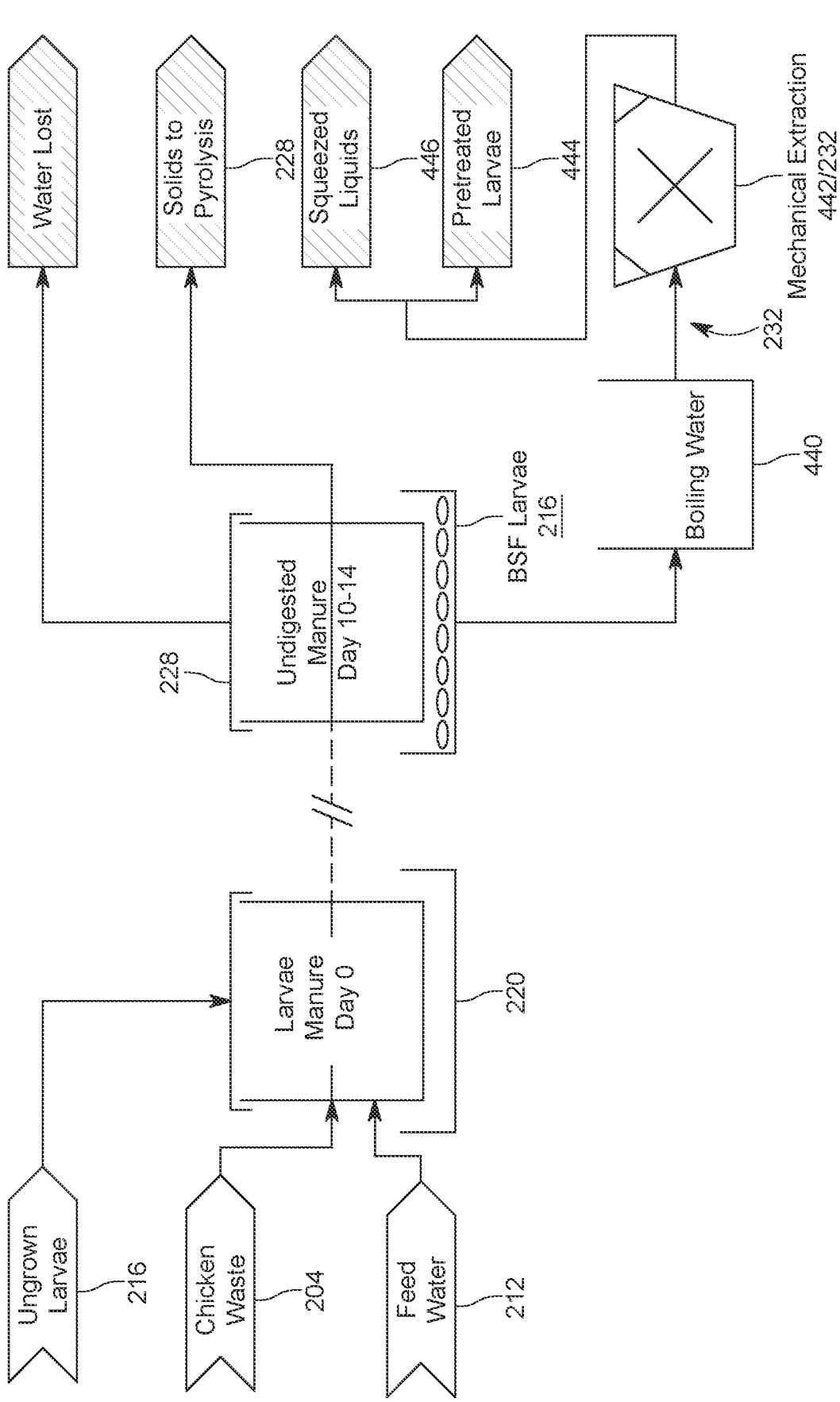
FIG. 5A illustrates a process flow for larva growing and larva pretreating.
Figure 5C:
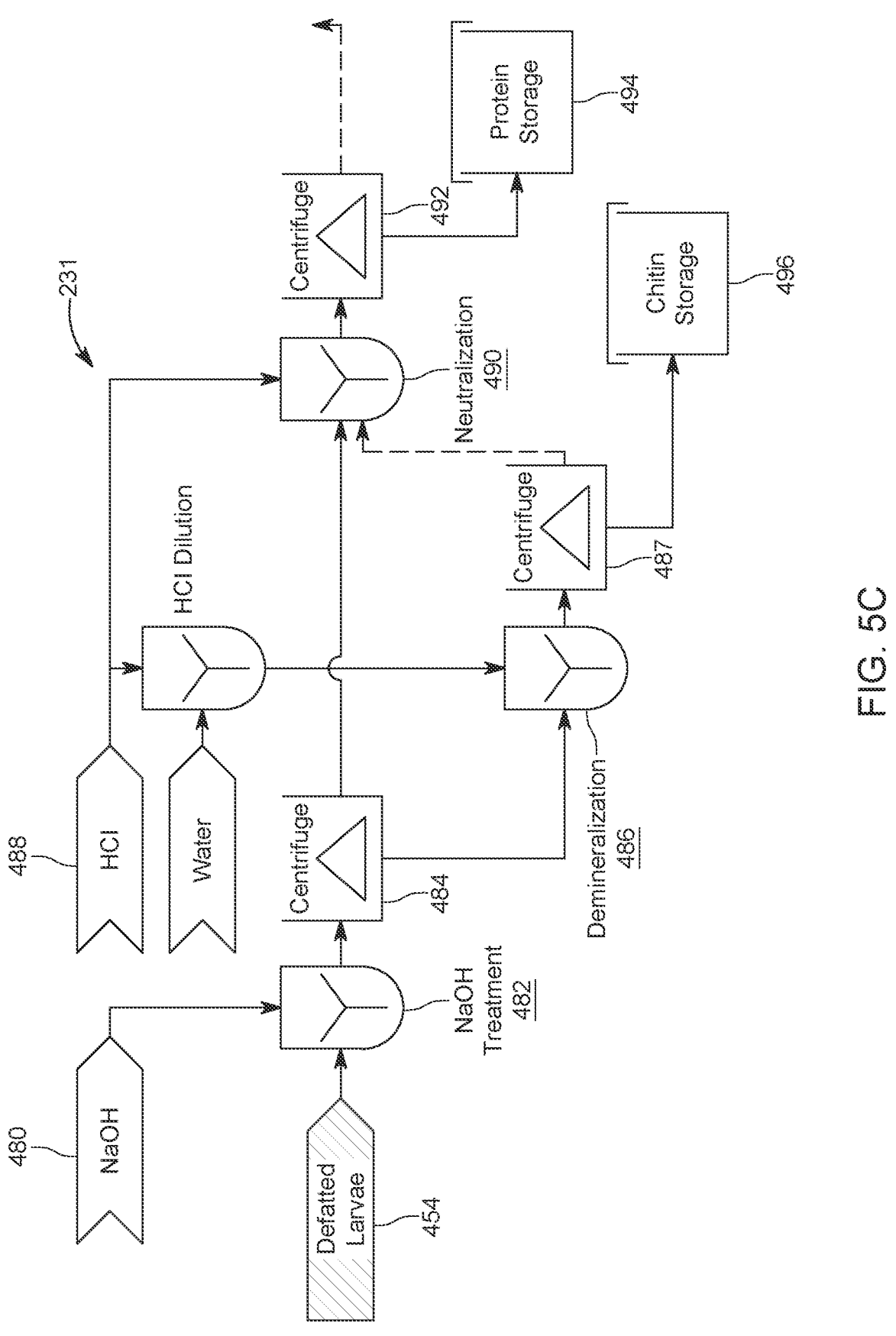
FIG. 5C illustrates a process flow for chitin extraction from the larva.

In one embodiment, the deffating unit 232 and the processing unit 236 are implemented as illustrated in FIGS. 5A to 5C. More specifically, FIG. 5A schematically shows how the chicken waste 204 is fed, together with feed water 212 and ungrown larvae 216 to the tray 220. After the 10-14 days period in which the larvae grow by eating parts of the chicken waste 204, the larvae are incapacitated using boiling water in a tank 440, and then a mechanical extraction unit 442 is used to generate pretreated larvae 444 and squeezed liquids 446. The pre-treated larvae 444 are then mechanically grinded and pressed through an Auger press 448, as illustrated in FIG. 5B.I.

FIGS. 5B.I and 5B.II illustrate the lipid extraction process flow. The obtained water is decanted in tank 450, and the fats are stored for further processing. The pulp is further defatted through chemical extraction. Petroleum ether 452 is added to the pulp in an agitated vessel. The fat-containing solvent is decanted in decanter 462, and the residual larvae are moved to protein/chitin extraction as defatted larvae 454. The fats are distillated in distillation tank 470 and combined with the mechanically extracted fats and stored in oil storage tank 464. The solvent 452 is recovered with a solvent condenser 472 and stored in a solvent storage 474, and then reused in the extraction. At 70° C., in an agitator reactor 456, the fats are mixed with methanol, ethanol, or other alcohols 458 for sequential acid-catalyzed and base-catalyzed esterification and transesterification. The obtained ester, which is stored in tank 460, is used as biolubricant additive.

Defatted larvae pellets 454 are treated with NaOH 480 at 40° C. in a tank 482, as illustrated in FIG. 5C. FIG. 5C illustrates the process flow for the protein and chitin extraction in the chitin and protein extraction unit 231. The chitin rich pellet is taken to a demineralization tank 486 followed by centrifuge 487. The precipitate is washed with water and dried at 40° C., and then stored in a chitin storage tank 496. The acid 488 is added to the protein solution to adjust the pH to 3.5-5 isoelectric point for insect protein to precipitate. The supernatant, the protein solution, is neutralized in reactor 490 and the proteins are precipitated with acid and centrifuged in a centrifuge 492 to separate it from the solvent. The resulting proteins are stored in a tank 494.

Figure 8:
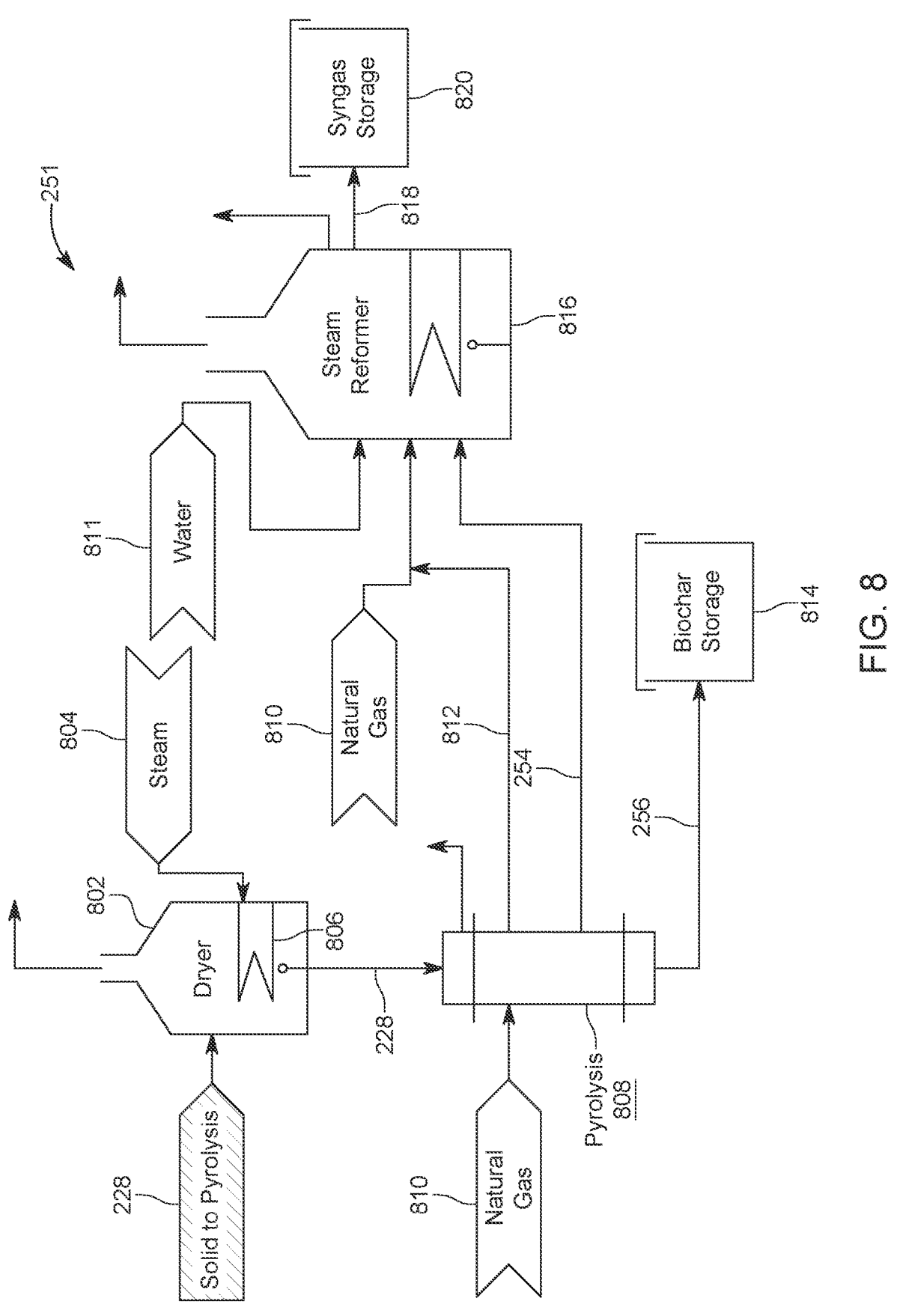
FIG. 8 illustrates the process flow of the pyrolysis and steam reforming of the oil.

Returning to FIG. 2, the undigested solid waste 228, together with the remaining fraction of the larvae pellets 454, is supplied, for example, by a conveyor belt 250 to a thermo-processing unit 251, that includes a pyrolysis unit 252, which generates bio-oil 254 and bio-char 256. The bio-oil 254 may be used to generate hydrogen 258. The configuration of the unit that achieves these transformations is now discussed in more detail with regard to FIG. 8. FIG. 8 illustrates one implementation of the process flow of the pyrolysis and steam reforming of the undigested solid waste 228. The undigested solid waste 228 is first dried in a dryer 802. Steam 804 may be supplied to a coil 806 located in the dryer for drying the undigested solid waste 228. The spent steam is then supplied to a pyrolysis unit 808. Together with a supply of natural gas 810, the dried undigested solid waste 228, which mainly includes wood shavings, feathers, egg shells, etc., is deconstructed inside the pyrolysis unit 808 into bio-oil 254, gas 812, and biochar 256. The pyrolysis is a technique that converts poultry waste into char. It was previously discussed that the nitrogen content in poultry waste is very high (2.2-6%). This variable nitrogen content can be attributed to the varied amounts of chicken manure (primary nitrogen containing source), wood shavings (used as bedding) and feathers. The high nitrogen content in the feed results in the formation of NOx and nitrogen-containing compounds in the bio-oil. The integration of BSF larvae treatment of the waste as a step prior to pyrolysis results in a significant nitrogen removal, below 1.5%. This can be attributed to the fact that the BSF larvae will feed on the organic nitrogen and convert it into proteins and chitin using their biological metabolism. In spite of this process, the presence of nitrogen in the inorganic waste 228 present as mineral salts as nitrates cannot be avoided. However, this nitrogen is trapped in the solid biochar 256 during the pyrolysis process.

While the obtained biochar 256 is stored in biochar storage tank 814, the obtained bio-oil 254 is further processed in a steam reformer reactor 816 together with natural gas 810, the gas 812 from the pyrolysis unit 808, and water 811 for generating syngas 818, which is stored in a syngas tank 820. The bio-oil, depending on its composition, can be used in the manufacturing of platform chemicals or drop-in fuels. Bio-oil can serve as a potential feedstock for the manufacture of bio-adhesives. Wood-derived bio-oil application reduced the carcinogenic formaldehyde emissions from urea-formaldehyde resins used in the wood-based panels. The compounds in the bio-oil have also shown significant insecticidal and anti-microbial activity and exhibit a potential to be used as biopesticides. Bio-oil also finds application in controlling the leaching of N, P, K and enhance their uptake by the plants. Bio-oil coating of slow-release fertilizer resulted in a leaching rate of less than 10% as compared to 80% associated with normal fertilizer.

Biochar obtained from the pyrolysis of wood are known to have high pH, high aromatic character and low cation exchange capacity. They are widely used to improve the carbon storage in tropical soil. The high heating value of the pinewood derived pyrolysis biochar can reach as high as 34 MJ kg$^{-1}$. Chicken feather pyrolysis biochar has been used as follows: nitrogen-doped carbon nanotubes as catalyst, developing sustainable biocomposites, microporous carbon-nitrogen fibers and carbon microspheres, and hydrogen storage.

These applications of chicken feather pyrolysis char make them a value-added product. The specific surface area of the pyrolyzed chicken feather fibers was observed to be in the range of 10-430 $m^2 g^{-1}$, depending on the pyrolysis parameters (time and temperature). Thus, the high surface area of the pyrolsysis char makes it a potential option for pollutant removal from wastewater. The pyrolysis of poultry litter already has been investigated for the removal of toxic metal ions from the wastewater. In order to reduce the environmental impact of the plant 200, the pyrolysis biochar (from a mixture of feathers and wood shavings) is used to clean the waste stream generated from the processing unit and then reuse it before being discharged. The biochar utilized for removal of pollutants from water is regenerated and then reused in the process. The biochar, after being used for pollutant removal, still has a high carbon content. Thus, large amounts of carbon can be stored in this form resulting in negative or very low carbon footprint from the plant 200.

In a pyrolysis experiment performed by the inventors, 3 kg of dried feedstock (residual waste) was processed for conversion into valuable products such as bio-oil and biochar. The moisture content of the feedstock was around 15%. A lab-scale dryer was used to dry the wet residual waste. The bio-oil, biochar and gas yields (dry basis) were 32.7%, 26.1% and 41.2%, respectively. The products were characterized using various methods. It was found that the BSF larvae metabolized a significant amount of nitrogen and the objective of nitrogen reduction was achieved. It can be noted that the nitrogen content of the bio-oil from the pyrolysis of residue was reduced by 22% as compared to pyrolysis of chicken manure.

All the various embodiments discussed above use BSF larvae. In one application, the BSF grow-out conditions are as now discussed. For a load of 300 kg chicken manure (dry basis), and 700 kg wastewater (water recycled from the agriculture activities), 3 million BSF young larvae (1.5 kg) was provided and the mixture was distributed in plural plastic bins (batch reactor) 220 for 10-14 days.

During the 14 days growing process, the moisture content was decreased from 70 to 52 wt % due to larvae and microbial activities. These biological activities were exothermic and increased the feedstock temperature from 25 to 40 C. The BSF larvae consumed nutrients in the feedstock and grew from 0.5 to 66.7 mg in average. The weight of larvae was increased by 130 times, which is the typical lifecycle feature of insects. The increased body weight contains primary energy resource for stages of pupa and adult for the reproduction.

A method that integrates larvae-based natural processing with chemical processing for transforming animal waste into chemical products in a waste treatment plant is now discussed with regard to FIG. 9. The method includes a step 900 of receiving, at a pretreatment unit, animal waste, moisturizing the animal waste with water, providing black soldier fly, BSF, larvae, and loading a tray with a mixture of the animal waste, water, and the BSF larvae, a step 902 of placing in a storage room the tray and holding the tray between 10 and 14 days, a step 904 of separating the BSF larvae from undigested animal waste, at a separation mechanism, from the tray, after the 10 to 14 days, a step 906 of extracting chitin and proteins at a chitin and protein extraction unit from the BSF larvae, and a step 908 of thermo-processing the undigested animal waste and extracting bio-oil and bio-char. An amount of nitrogen in the animal waste is larger than 2.0% and an amount of nitrogen in the undigested animal waste is smaller than 1.5%.

The method may further include a step of inactivating the BSF larvae with boiling water and a step of mechanically pressing, with a mechanical extraction mechanism, the BSF larvae, to generate oil, pre-treated larvae and squeezed liquids. The method also may include a step of grinding the pre-treated larvae to further extract oil from the pre-treated larvae and discharging deffated larvae, a step of extracting water from the squeezed liquids, and a step of distilling the oil.

The method may further include a step of esterifying the oil in the presence of alcohol, an acid, a base and steam to generate an ester, and/or a step of generating chitin pellets and a protein solution by applying a NaOH treatment the deffated larvae. The method may also include a step of demineralizing the chitin pellets, and a step of removing a liquid from the demineralized chitin pellets. In one application, the method may also include a step of neutralizing the protein solution, and a step of precipitating proteins from the protein solution. The method may further include a step of drying the undigested animal waste to generate dry undigested animal waste, and/or a step of pyrolyzing the dry undigested animal waste to form the bio-char and the bio-oil, and/or a step of steam reforming the bio-oil and natural gas and generating syngas. The animal waste is chicken waste.

The disclosed embodiments provide a waste treatment plant and method that integrates larvae-based natural processing with chemical processing for transforming animal waste into valuable products. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] X. Hu, M. Gholizadeh. Biomass pyrolysis: a review of the process development and challenges from initial researches up to the commercialization stage, J. Energy Chem. 2019 (39) 109-143.
[2] M. Baniasadi, A. Tugnoli, R. Conti, C. Torri, D. Fabbri, V. Cozzani. Waste to energy valorization of poultry litter by slow pyrolysis, Renew. Energy 2016 (90) 458-468.

[3] S. Hadroug, S. Jellali, J. J. Leahy, M. Kwapinska, M. Jeguirim, H. Hamdi, W. Kwapinski. Pyrolysis process as a sustainable management option of poultry manure: Characterization of the derived biochars and assessment of their nutrient release capacities, Water 2019 (11) 2271.

[4] D. S. Pandey, G. Katsaros, C. Lindfors, J. J. Leahy, S. A. Tassou. Fast pyrolysis of poultry litter in a bubbling fluidized bed reactor: energy and nutrient recovery, Sustainability 2019 (11) 2533.

[5] F. Gabler, B. Vinneras. Using black soldier fly for waste recycling and effective *Salmonella* spp. reduction. Thesis. Swedish University of Agricultural Sciences, Sweden 2014.

[6] D. Sarpong, S. Oduro-Kwarteng, S. F. Gyasi, R. Buamah, E. Donkor, E. Awuah, M. K. Baah. Biodegradation by compositing of municipal organic solid waste into organic fertilizer using the black soldier fly (*Hermetia illucens*) (Diptera: Stratiomyidae) larvae, Int. J. Recycl. Org. Waste 2019 (8) 45-54.

[7] L. Alvarez. The role of black soldier fly, *Hermetia illucens* (L.) (Diptera: Stratiomyidae) in sustainable waste management in northern climates. Thesis. University of Windsor 2012.

[8] Y. S. Wang, M. Shelomi. Review of black soldier fly (*Hermetia illucens*) as animal feed and human food, Foods 2017 (6) 91.

[9] J. A. Cammack, J. K. Tomberlin. The impact of diet protein and carbohydrate on select life-history traits of the black soldier fly *Hermetia illucens* (L.) (Diptera: Stratiomyidae). Insects 2017 (8) 56.

[10] From pilot to full scale operation of a waste-to-protein treatment facility, www.unescap.org/sites/default/files/Session4%20-%20imanol1.pdf (Link accessed November 2020).

[11] R. Smets, B. Verbinnen, I. Van de Voorde, G. Aerts, J. Claes, M. Van der Borght. Sequential extraction and characterisation of lipids, proteins, and chitin from black soldier fly (*Hermetia illucens*) larvae, prepupae, and pupae, Waste Biomass Valorization 2020, doi.org/10.1007/s12649-019-00924-2.

[12] B. Matthäus, T. Piofczyk, H. Katz, F. Pudel. Renewable resources from insects: exploitation, properties, and refining of fat obtained by cold-pressing from *Hermetia illucens* (black soldier fly) larvae, Eur. J. Lipid Sci. Technol. 2018 (121) 1800376.

What is claimed is:

1. A waste treatment plant that integrates larvae-based natural processing with chemical processing for transforming animal waste into chemical products, the plant comprising:
   a pretreatment unit configured to receive animal waste, moisturize the animal waste with water, provide black soldier fly, BSF, larvae, and load a tray with a mixture of the animal waste, water, and the BSF larvae;
   a storage room configured to receive the tray and hold the tray between 10 and 14 days;
   a separation mechanism configured to receive a content of the tray after the 10 to 14 days, and separate the BSF larvae from undigested animal waste;
   a chitin and protein extraction unit configured to receive the BSF larvae and extract chitin and proteins; and
   a thermo-processing unit configured to receive the undigested animal waste and extract bio-oil and bio-char,
   wherein an amount of nitrogen in the animal waste is larger than 2.0% and an amount of nitrogen in the undigested animal waste is smaller than 1.5%.

2. The plant of claim 1, wherein the chitin and protein extraction unit comprises:
   a tank of boiling water for inactivating the BSF larvae; and
   a mechanical extraction mechanism configured to mechanically press the BSF larvae, to generate oil, pre-treated larvae and squeezed liquids.

3. The plant of claim 2, wherein the chitin and protein extraction unit further comprises:
   a processing unit configured to grind the pre-treated larvae and further extract oil from the pre-treated larvae and discharge deffated larvae;
   a decanter configured to extract water from the squeezed liquids; and
   an oil distillation unit configured to distil the oil.

4. The plant of claim 3, wherein the chitin and protein extraction unit further comprises:
   an esterification unit configured to receive the oil, alcohol, an acid, a base and steam to generate an ester.

5. The plant of claim 4, wherein the chitin and protein extraction unit further comprises:
   a NaOH treatment tank configured to receive the deffated larvae and NaOH and generate chitin pellets and a protein solution.

6. The plant of claim 5, wherein the chitin and protein extraction unit further comprises:
   a demineralization unit where the chitin pellets are demineralized; and
   a centrifuge to remove a liquid from the demineralized chitin pellets.

7. The plant of claim 6, wherein the chitin and protein extraction unit further comprises:
   a neutralization tank to neutralize the protein solution; and
   a centrifuge to precipitate proteins from the protein solution.

8. The plant of claim 7, wherein the thermo-processing unit comprises:
   a dryer configured to dry the undigested animal waste to generate dry undigested animal waste; and
   a pyrolysis unit configured to pyrolyze the dry undigested animal waste to form the bio-char and the bio-oil.

9. The plant of claim 8, wherein the thermo-processing unit comprises:
   a steam reformer configured to receive the bio-oil and natural gas and generate syngas.

10. The plant of claim 1, wherein the animal waste is chicken waste.

11. A method that integrates larvae-based natural processing with chemical processing for transforming animal waste into chemical products in a waste treatment plant, the method comprising:
   receiving, at a pretreatment unit, animal waste, moisturizing the animal waste with water, providing black soldier fly, BSF, larvae, and loading a tray with a mixture of the animal waste, water, and the BSF larvae;
   placing in a storage room the tray and holding the tray between 10 and 14 days;
   separating the BSF larvae from undigested animal waste, at a separation mechanism, from the tray, after the 10 to 14 days;
   extracting chitin and proteins at a chitin and protein extraction unit from the BSF larvae; and
   thermo-processing the undigested animal waste and extracting bio-oil and bio-char,
   wherein an amount of nitrogen in the animal waste is larger than 2.0% and an amount of nitrogen in the undigested animal waste is smaller than 1.5%.

12. The method of claim 11, further comprising:

inactivating the BSF larvae with boiling water; and mechanically pressing, with a mechanical extraction mechanism 442, the BSF larvae, to generate oil, pretreated larvae and squeezed liquids.

13. The method of claim 12, further comprising:

grinding the pre-treated larvae to further extract oil from the pre-treated larvae and discharging deffated larvae;

extracting water from the squeezed liquids; and distilling the oil.

14. The method of claim 13, further comprising:

esterifying the oil in the presence of alcohol, an acid, a base and steam to generate an ester.

15. The method of claim 14, further comprising:

generating chitin pellets and a protein solution by applying a NaOH treatment to the deffated larvae.

16. The method of claim 15, further comprising:

demineralizing the chitin pellets; and removing a liquid from the demineralized chitin pellets.

17. The method of claim 16, further comprising:

neutralizing the protein solution; and precipitating proteins from the protein solution.

18. The method of claim 17, further comprising:

drying the undigested animal waste to generate dry undigested animal waste; and pyrolyzing the dry undigested animal waste to form the bio-char and the bio-oil.

19. The method of claim 18, further comprising:

steam reforming the bio-oil and natural gas and generating syngas.

20. The method of claim 11, wherein the animal waste is chicken waste.

* * * * *